Oct. 27, 1925.  1,558,556
J. A. LUKE
ANTISKID CHAIN FASTENER
Filed Feb. 12, 1925

Inventor
James A. Luke
By John A. Bornhardt
Attorney

Patented Oct. 27, 1925.

1,558,556

UNITED STATES PATENT OFFICE.

JAMES A. LUKE, OF CLEVELAND, OHIO, ASSIGNOR OF ONE-HALF TO EDWARD N. SMITH, OF CLEVELAND, OHIO.

ANTISKID-CHAIN FASTENER.

Application filed February 12, 1925. Serial No. 8,686.

*To all whom it may concern:*

Be it known that I, JAMES A. LUKE, a citizen of the United States, residing at Cleveland, in the county of Cuyahoga and State of Ohio, have invented certain new and useful Improvements in Antiskid-Chain Fasteners, of which the following is a specification.

This invention relates to improvements in anti-skid chain fasteners, having for an object the provision of means for securing short transverse or cross chains to the wheels of automobile trucks and the like vehicles.

A further object is to provide a fastening device of the character above stated which may be easily manipulated for attachment to a wheel and at the same time will reliably retain a cross-chain in proper relative position upon the wheel.

It is likewise an object to provide a fastener of this character of extremely simple construction and so formed as to be comparatively inexpensive in manufacture.

Other objects will be in part obvious and in part pointed out hereinafter.

In order that the invention and its mode of operation may be readily understood by those skilled in the art, I have in the accompanying illustrative drawings and detailed description thereof pointed out the preferred embodiment of the same.

In the accompanying drawings and throughout the following specification similar characters of reference designate similar parts.

This chain fastening device is engageable with the felloe F of a wheel, while the anti-skid chain C extends across or transversely over the tire T. The fastening device or bar is preferably formed as illustrated and comprises a length of metal relatively wide at the one end and tapering or converging toward its other end. The narrow end portion is flattened at right angles to the face of the bar and is provided with an aperture or eyelet 5 in which one end of the cross-chain C is preferably permanently fixed.

Figure 3:
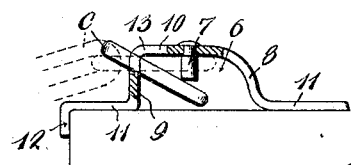
Figure 3 is a detail view partially in section showing the steps taken in application of the device.

At a point adjacent the wide end, the bar is off-set or bent away from the main portion to form a substantially U-shaped recess 6 in which is arranged a catch member or lug 7 as shown in Figure 3. This catch member or lug is in the form of a rivet-like element and is designed to fit into a link of a chain C as clearly shown in Figure 3. One end wall 8 of this recess 6 is preferably though not necessarily curved while the other or outer wall 9 is arranged at right angles to the side wall 10 in which the lug or catch member 7 is fixed. The second named or right angularly formed wall 9 terminates at a point longitudinally alined with the body 11 of the bar or fastening device, at which point the metal is bent into a plane with the body 11 as clearly illustrated. A hook portion or stop finger 12 is formed through bending the wide end of the bar at a right angle to the body 11 and to the opposite side from that in which the recess 6 is formed. As shown, this stop finger or hook 12 engages one corner of the felloe and due to the relative arrangement of the portion carrying the eyelet 5, movement between the fastening device and the felloe is limited.

Figure 1:
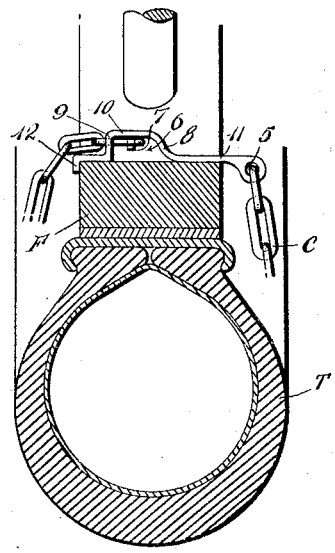
Figure 1 is a cross-sectional view of a portion of a truck wheel showing my improved chain fastener associated therewith.
Figure 2:
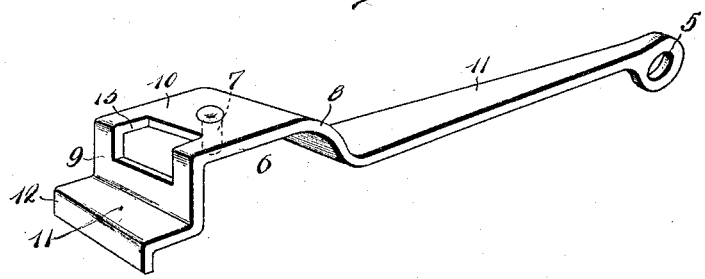
Figure 2 is a detail perspective view of the fastening bar or device.

In order that a link of the anti-skid chain C may be slipped over the catch member or lug 7 I slot or notch the end and side walls 9 and 10, these notches merging as indicated quite clearly in Figure 2. This arrangement provides a substantially L-shaped opening 13 and as shown in Figure 3, a link to be slipped over the lug 7 will have one end passed through the opening in an inclined position and after it has been inserted a sufficient distance the outer end of the link will be pressed downwardly or toward the body 11 of the bar thus completing the attaching operation.

It is obvious that attachment and detachment of this device is considerably facilitated due to the extremely simple construction and it is also clear that the cost of manufacturing is materially lessened.

Certain changes in minor details of construction may be resorted to, and such of these changes as may fall within the scope of the appended claims I consider within the spirit of my invention.

I claim:

1. A device for fastening a transverse anti-skid chain to an automobile wheel, said device comprising, a bar arrangeable transversely upon a felloe, means for limiting relative movement of the bar upon the felloe, a portion of said bar being off-set to form a recess between the bar and felloe, and a lug carried by the bar and arranged in the recess, said off-set portion having a slot to permit insertion of one chain link for engagement with said lug.

2. A device for fastening a transverse anti-skid chain to an automobile wheel, said device comprising a transversely arranged bar adapted to span a felloe, means at opposite ends of the bar to limit its transverse movement on the felloe, an offset portion in the bar forming a recess between the bar and felloe, and a catch member arranged in the recess, said offset portion having a slot to permit insertion of a chain link for engagement with the catch member.

3. A fastening device of the character set forth comprising, an elongated flat bar having an offset portion near one end, a lug arranged in the offset portion, a slot formed in the offset portion to permit insertion of a chain link for engagement with the lug, and means for limiting transverse movement of the device when arranged upon a felloe.

4. A fastening device of the character set forth, comprising an elongated flat bar having one relatively wide end portion, an offset adjacent end portion, a lug arranged in the offset portion, a substantially L-shaped transverse slot formed in said off-set, a stop finger at the widened end portion, and means to permit attachment of a chain link to the other end of said device.

In testimony whereof, I affix my signature.

JAMES A. LUKE.